United States Patent
Nishida et al.

(10) Patent No.: US 6,433,443 B2
(45) Date of Patent: Aug. 13, 2002

(54) SWITCHING POWER SUPPLY HAVING TWO OR MORE DC OUTPUTS WITH SWITCHING CIRCUIT PROVIDED BETWEEN THE OUTPUTS

(75) Inventors: Akio Nishida, Kyoto; Ryota Tani, Otokuni-gun; Koji Nakahira, Kyoto; Tomohiro Yamada, Nagaokakyo, all of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/756,954

(22) Filed: Jan. 9, 2001

(30) Foreign Application Priority Data

Jan. 11, 2000 (JP) ......................................... 2000-002516

(51) Int. Cl.$^7$ ................................................. H02J 1/00
(52) U.S. Cl. .................... 307/35; 363/21.15; 363/21.16; 363/97
(58) Field of Search ................................ 363/20, 21.01, 363/21.12, 21.15, 21.16, 49, 97, 131; 307/32, 35, 38.41

(56) References Cited

U.S. PATENT DOCUMENTS 5,689,407 A  11/1997  Marinus et al.
5,812,383 A * 9/1998  Majid et al. .................. 363/49

FOREIGN PATENT DOCUMENTS

JP          08126313          5/1996

* cited by examiner

Primary Examiner—Edward H. Tso
Assistant Examiner—Gary L. Laxton
(74) Attorney, Agent, or Firm—Ostrolenk, Faber, Gerb & Soffen, LLP

(57) ABSTRACT

A switching power supply having two or more DC outputs includes a DC power supply, a transformer having a primary winding, at least two secondary windings, and a feedback winding, a main switching element having an off-state period and an on-state period, connected in series to the primary winding and to be turned on by a voltage generated in the feedback winding, the main switching element having a control terminal and a threshold voltage to turn the main switching element on; and a rectifying circuit connected to each secondary winding, a starting circuit which initially turns on the main switching element at startup of the power supply and a switching circuit provided between the two DC outputs, and wherein, when the switching circuit is turned on, a voltage generated in the feedback winding is lowered during the off-state period of the main switching element and a voltage to be applied to the control terminal of the main switching element is controlled so as to be less than the threshold voltage, and the main switching element is turned on by the starting circuit.

24 Claims, 8 Drawing Sheets

SWITCHING POWER SUPPLY HAVING TWO OR MORE DC OUTPUTS WITH SWITCHING CIRCUIT PROVIDED BETWEEN THE OUTPUTS

BACKGROUND OF THE INVENTION

1. Field of the Invention

This invention relates to a switching power supply and more particularly to a switching power supply of a self-excited ringing choke converter (hereinafter referred to as RCC) type.

2. Description of the Related Art

Generally, electronic equipment such as electronic computers and communication devices require stable DC voltages. In order to supply stable DC voltages for such electronic equipment using the commercially available power source, switching power supplies of RCC type which has a relatively simple construction and shows high degrees of efficiency are widely used.

FIG. 7 is the circuit diagram of such a conventional switching power supply of RCC type. In FIG. 7, a switching power supply 1 is provided with an input circuit 2, a main operating circuit 3, a voltage detecting circuit 4, a voltage output terminal OUT, and a ground terminal GND. The input circuit 2 comprises a diode bridge circuit DB for rectification, and a fuse F and a filter circuit LF both of which are provided between an AC power supply and the input terminal of the diode bridge circuit DB.

Furthermore, the main operating circuit 3 comprises a capacitor C1 for smoothing provided between the output terminals a and b of the diode bridge DB in the input circuit 2; a transformer T containing a primary winding N1, a secondary winding N2 having the opposite polarity to that of the primary winding N1, and a feedback winding having the same polarity as the primary winding N1; a FET Q1 as a switching element connected in series to one end of the primary winding N1 of the transformer T; a resistor R1 for starting connected between the other end of the primary winding N1 and the gate as a control terminal of the FET Q1, a resistor R8 connected between the gate and source of the FET Q1, a diode D1 for rectification connected in series to one end of the secondary winding N2 of the transformer T, and a capacitor C4 for smoothing connected between the other end of the secondary winding N2 and the voltage output terminal OUT.

Furthermore, the voltage detecting circuit 4 is provided on the output side of the main operating circuit 3 and contains a resistor R5, a light-emitting diode PD on the emission side of a photo coupler PC, a shunt regulator Sr, and resistors R6 and R7. The resistor R5, the light-emitting diode PD, and the anode and cathode of the shunt regulator are connected in series and are provided so as to be parallel to the capacitor C4 of the main operating circuit 3. Furthermore, the resistors R6 and R7 are connected in series and are also provided to be parallel to the capacitor C4. The connection point of the resistors R6 and R7 is connected to the control terminal of the shunt regulator Sr.

Furthermore, a control circuit 5 comprises a resistor R9 and a capacitor C3 connected between one end of the feedback winding NB and the gate of the FET Q1, a transistor Q2 connected between the gate and source of the FET Q1, a resistor R2 connected between one end of the feedback winding NB and the base of the transistor Q2, a resistor R3 and a capacitor C2 connected in parallel between the base and emitter of the transistor Q2, and a resistor R4, a diode D2, and a phototransistor PT on the light-receiving side of a photo coupler PC connected in series between one end of the feedback winding NB and the base of the transistor Q2.

Next, the operation of the switching power supply 1 thus constructed is described. First of all, at start, a voltage is applied to the gate of the FET Q1 through the resistor R1 and the FET Q1 is turned on. When the FET Q1 is turned on, the voltage of the power supply is applied to the primary winding N of the transformer T, a voltage in the same direction as the voltage generated in the primary winding N1 is generated in the feedback winding NB, and then the FET Q1 is rapidly turned on because of positive feedback. At this time, excitation energy is stored in the primary winding N1.

When the capacitor C2 is charged through the resistor R2 and the potential of the base of the transistor Q2 reaches the threshold, the transistor Q2 is turned on and the FET Q1 is tuned off. Because of this, the excitation energy stored in the primary winding N1 of the transformer T, while the FET Q1 is turned on, is discharged as electric energy through the secondary winding N2, and the electric energy is rectified by the diode D1, smoothed by the capacitor C4, and supplied to a load through the voltage output terminal OUT.

Furthermore, when the excitation energy stored in the primary winding N1 of the transformer T is discharged through the secondary winding N2, a flyback voltage VNB is generated in the feedback winding NB. The change of this flyback voltage VNB is described with reference to FIG. 8. In FIG. 8, at the time t11, the FET Q1 is turned off and the flyback voltage VNB is kept at a nearly constant value Vb, that is, it goes into a so-called off-state period. Then, at the time t12, the voltage of the diode D1 becomes zero and the flyback voltage starts to oscillate, and when the flyback voltage VNB rises and the gate voltage reaches the threshold Vth at t13, the FET Q1 is turned on. Moreover, part of the flyback voltage VNB shown by the chain line shows the case where the flyback voltage VNB is assumed to continue to oscillate. In this way, when the FET Q1 is turned off, a voltage is applied to the primary winding N1 again and the excitation energy is stored.

In the switching power supply 1, such an oscillation is repeated. In a steady state, the output voltage on the load side is divided by the resistors R6 and R7, and this divided detection voltage and the reference voltage of the shunt regulator Sr are compared. Then, the change of the output voltage is amplified at the shunt regulator Sr, the current flowing in the light-emitting diode PD of the photo coupler PC is changed, and in accordance with the quantity of light emission of the light-emitting diode PD, the impedance of the phototransistor PT changes. Thus, the charge and discharge of the capacitor C2 can be changed and the output voltage can be controlled so as to be constant.

In the conventional switching power supply 1 shown in FIG. 7, at light load the oscillation frequency increases and the switching loss is large, which is a factor lowering the circuit efficiency. In order to solve this problem, a method can be considered whereby on the output side of the switching power supply a circuit lowering the output voltage can be provided so that by changing the impedance on the output side the output voltage Vo is lowered.

In this case, by making use of a fact that the voltage VNB generated in the feedback winding NB of the transformer T decreases in proportion to the output voltage Vo, the degree of decrease in the output voltage Vo is adjusted. By lowering the voltage VNB, the gate voltage of the FET Q1 is made to oscillate in the range where the gate voltage does not reach the threshold and the turn-on of the FET Q1 is delayed, and by making the off-state period of the FET Q1 extended the oscillation frequency is lowered, and thus the switching loss is reduced.

However, such a switching power supply of RCC type is characterized in that at light load, the frequency increases because the output current is small, and when a circuit lowering the output voltage is provided as described above, all the output voltages are decreased, and accordingly when a constant output voltage is required, there is a problem that a constant-voltage control circuit is required.

SUMMARY OF THE INVENTION

Therefore, it is an object of this invention to provide a switching power supply where the increase of switching loss is suppressed and a constant output voltage can be obtained.

According to the invention, a switching power supply is provided having two or more DC outputs, the power supply comprising a DC power supply; a transformer having a primary winding, at least two secondary windings, and a feedback winding; a main switching element connected in series to the primary winding and to be turned on by a voltage generated in the feedback winding; and a rectifying circuit connected to the secondary winding, further comprising a starting circuit which turns on the main switching element at start of the power supply and a switching circuit provided between two outputs on the secondary side, and wherein by turning on the switching means, the voltage generated in the feedback winding is lowered during the off-state period of the main switching element, a voltage to be applied to a control terminal of the main switching element is controlled so as to be less than the threshold voltage, and the main switching element is turned on by the starting circuit.

According to the structure described above, the switching frequency can be lowered during standby and the loss can be reduced so that the switching circuit is provided between two outputs of secondary windings of a transformer, and whereby, by turning on the switching circuit, a voltage generated in a feedback winding during the off-state period of a main switching clement is lowered, and a voltage to be applied to the control terminal of the main switching element is controlled so as to be less than the threshold level.

The at least two outputs on the secondary side contain a low voltage output as a controlled output and a high voltage output as an uncontrolled output, and the switching circuit may be connected between the low voltage output and the high voltage output. In this case, the accuracy of the voltage of the low output voltage can be improved(increased).

Alternatively, the switching circuit may be connected between the high voltage output and the low voltage output. In this case, the accuracy of the voltage of the high output voltage can be improved.

In addition to the aforementioned structure, one output may be contained as an output on the secondary side and another output may be connected to the DC output through a rectifying element and the switching circuit connected to another secondary winding which is different from the output. In this way, a switching power supply can be made having a single output and the number of parts can be reduced.

The switching circuit may be turned on and off by a signal from the outside.

Alternatively, the switching circuit may be turned on by detection of lowered load power, so that thus changing signals from the outside becomes unnecessary Further the switching element may have a voltage control terminal or a current control terminal. In the case where the switching element contains a voltage control terminal, when the gate of the switching element is controlled so as to be less than the threshold level, a complete off state of the switching element is maintained and accordingly very little the loss is generated in the off state.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
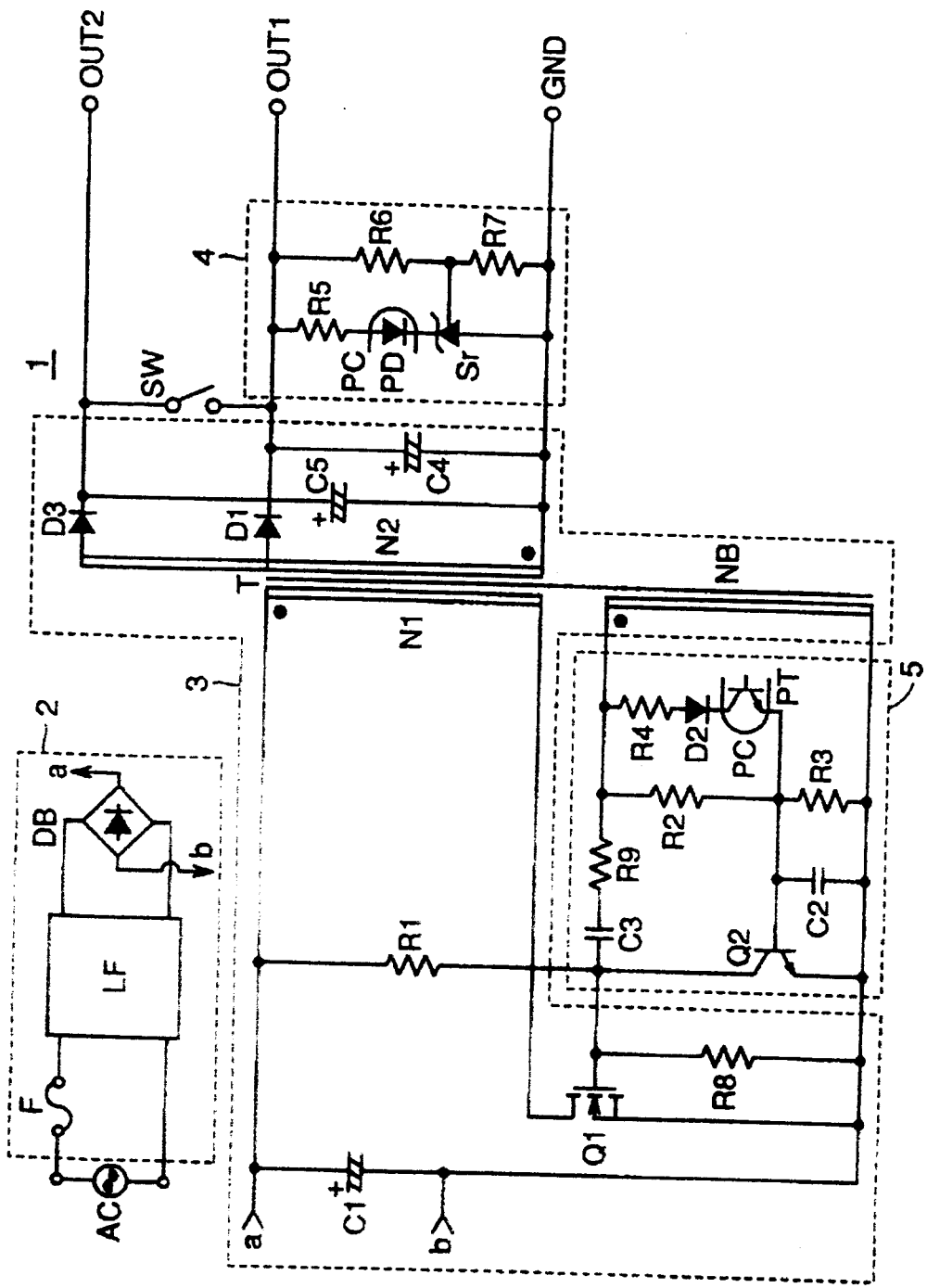
FIG. 1 is the circuit diagram of a switching power supply of one embodiment of this invention.

FIG. 1 is the circuit diagram of a switching power supply of one embodiment of this invention. In FIG. 1, two output terminals are provided for a secondary winding N2 of a transformer T. One output terminal outputs, for example, a low voltage of 5 V for logical circuits controlled by a voltage detecting circuit 4 and a control circuit 5, and a voltage in proportion to the turns ratio of the transformer T is output from the other output terminal and, for example, an uncontrolled high voltage of 24 V is output for motor drive. Between these output terminals a switch SW is connected.

Figure 7:
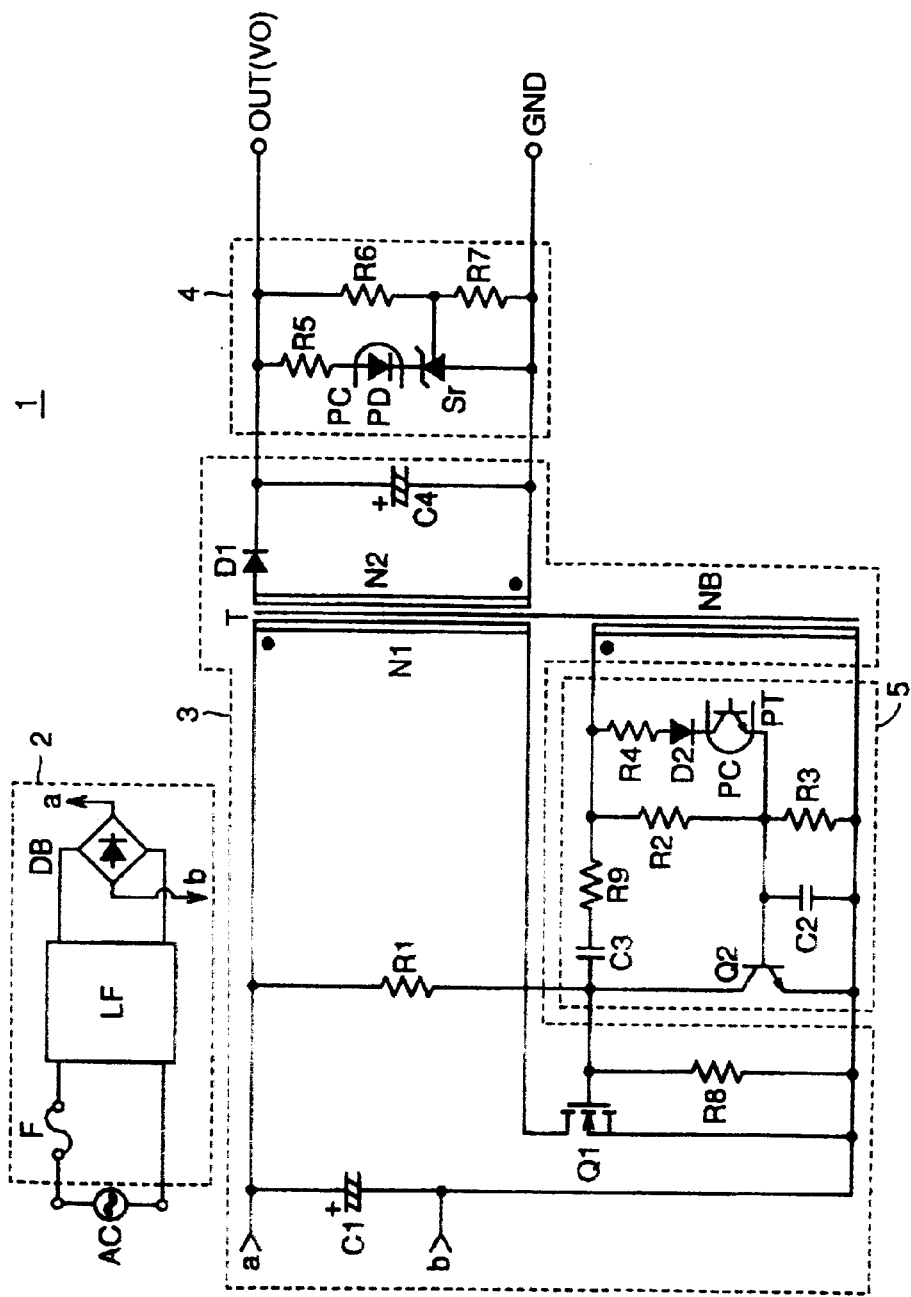
FIG. 7 is the circuit diagram of a conventional switching power supply of RCC type.

To the low voltage output terminal of the secondary winding N2, the anode of a rectifying diode D1 is connected in the same way as in FIG. 7, and to the high voltage output terminal, the anode of a rectifying diode D3 is connected. The cathode of the rectifying diode D1 is connected to the voltage output terminal OUT1 through the detecting circuit 4 and also connected to one terminal of the switch SW. The cathode of the diode D3 is connected to one terminal of a capacitor C5 for smoothing and the voltage output terminal OUT2, and also connected to the other terminal of the switch SW. The other terminal of the capacitor C5 for smoothing is grounded. The remaining structure is the same as that in FIG. 7.

Next, the operation of the switching power supply shown in FIG. 1 is described. When the switch SW is turned off, the same operation as in FIG. 7 is carried out as described above. When the switch SW is turned on, the high voltage output terminal and the low voltage output terminal of the secondary winding T2 are short circuited and at the same time 5 V is output. In this case, the high output voltage is reduced to 5/24 the former high output voltage. Therefore, the voltage of the feedback winding NB is also reduced at the same ratio, and the turn-on of an FET Q1 to be caused by the feedback winding NB can be prevented.

Figure 2:
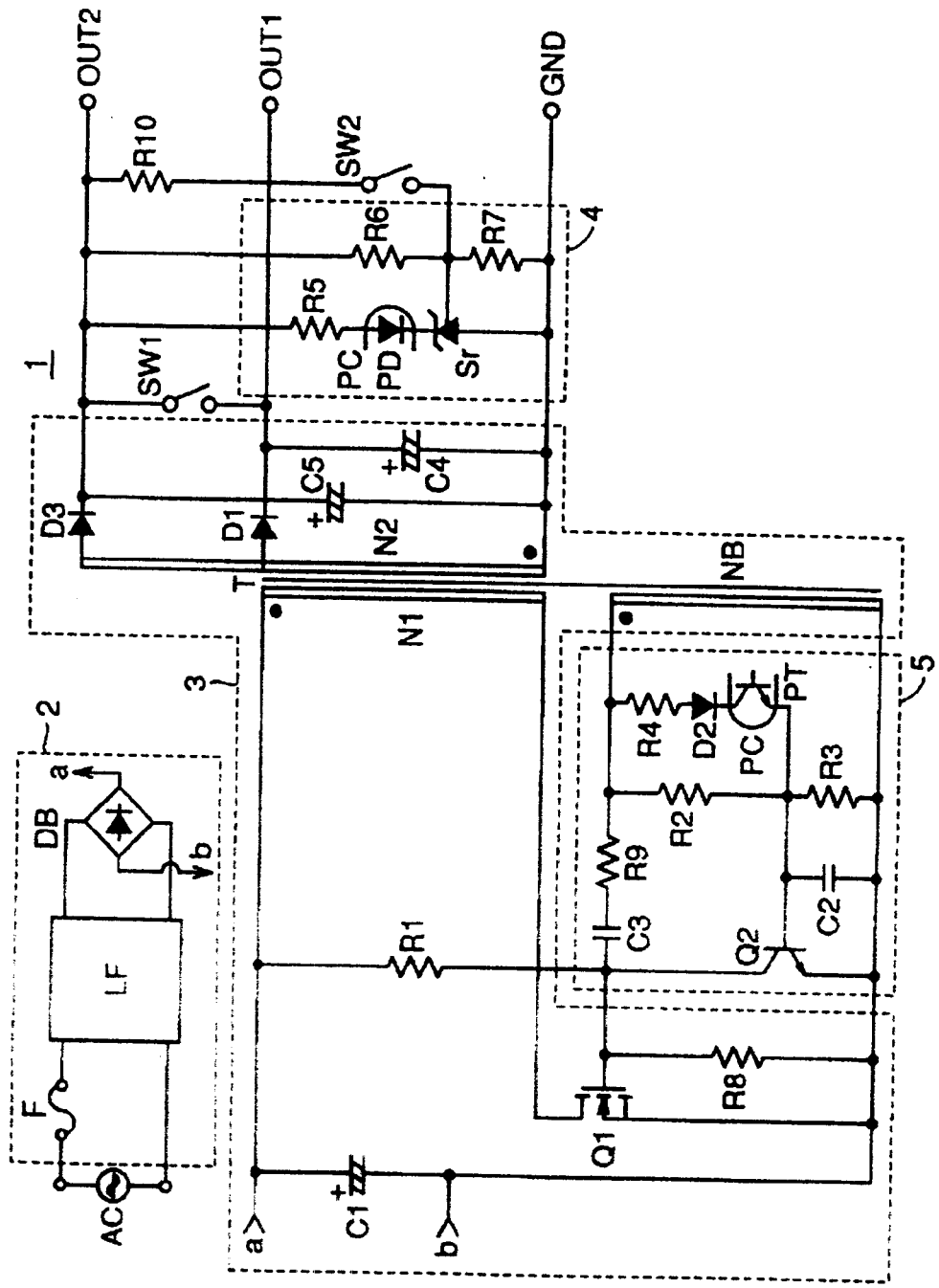
FIG. 2 is the circuit diagram of a switching power supply of another embodiment of this invention.

FIG. 2 is the circuit diagram of a switching power supply of another embodiment of this invention. In the embodiment shown in FIG. 1, the low voltage output is controlled by the voltage detecting circuit 4 and the control circuit 5 and the high output voltage is uncontrolled, but in the embodiment shown in FIG. 2, the high output voltage is controlled and the low output voltage is uncontrolled.

That is, one output terminal of the secondary winding N2 is controlled by a voltage detecting circuit 4 and a control circuit 5 and, for example, a high voltage of 24 V is output to a voltage output terminal OUT2. From the other output terminal of the secondary winding N2, for example, a low voltage of 5 V is output, rectified through a diode D1, and output to a voltage output terminal OUT1 after it has been smoothed through a capacitor C4.

Then, in the same way as in the embodiment of FIG. 1, between the voltage output terminals OUT1 and OUT2 a switch SW1 is connected. Furthermore, between the voltage output terminal OUT2 and the connection point of resistors R6 and R7 a series circuit of a resistor R10 and a switch SW2 is connected.

The operation when the switches SW1 and SW2 are turned off is nearly the same as in FIG. 7. For example, a voltage of 24 V is output as a controlled output from the voltage output terminal OUT2, and, for example, a voltage of 5 V is output as an uncontrolled output from the voltage output terminal OUT1.

When the switch SW1 is closed and the switch SW2 is closed at the same time, the voltage output terminals OUT1 and OUT2 are short circuited and a low voltage of 5 V divided by resistors R10 and R7 is provided to shunt regulator Sr, and accordingly voltages to be output from the voltage output terminals OUT1 and OUT2 are forced to the low voltage so as to output a voltage of 5 V. In this case, the high output voltage is reduced to 5/24 the former high output voltage. Therefore, the voltage of the feedback winding is also reduced at the same ratio, and the turn-on of an FET Q1 due to the feedback winding can be prevented.

Figure 3:
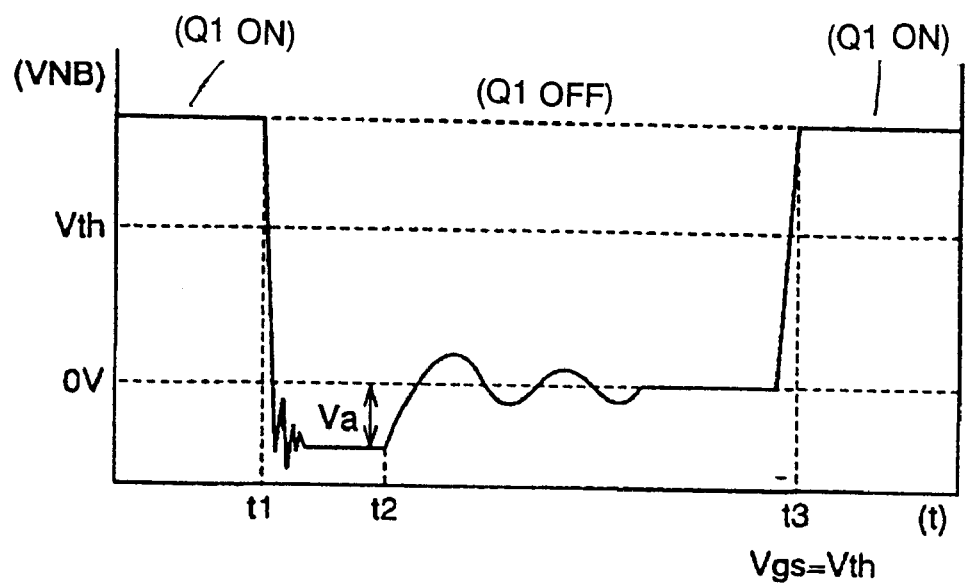
FIG. 3 is a waveform showing the change of a flyback voltage generated in a feedback winding.

FIG. 3 is a waveform showing the change of a flyback voltage VNB generated in the feedback winding. In FIG. 3, at the time t1, the FET Q1 is turned off and the flyback voltage VNB is maintained nearly constant after the generation of surge voltage so as to enter the so-called off-state period. Here, the absolute value of the flyback voltage VNB in the off-state period is expressed by the following formula (1) below. In the formula (1), NB is the number of turns of the feedback winding NB of the transformer T, N2 is the number of turns of the secondary winding, and VF is the forward voltage of the rectifying diode D1 in the main operating circuit 3.

$$|VNB|=(NB/N2)\times(VO1+VF) \quad (1)$$

Figure 8:
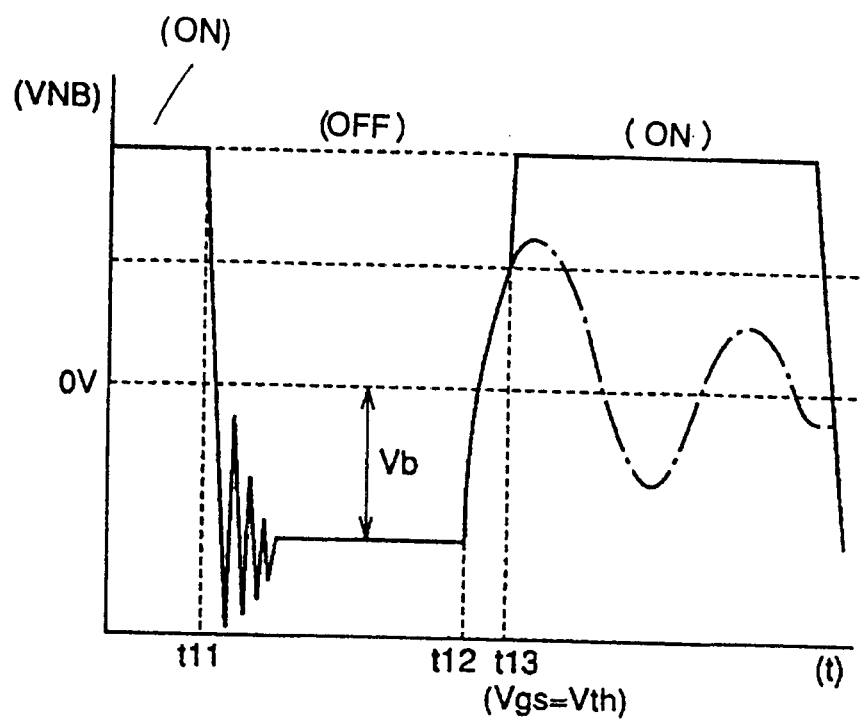
FIG. 8 is a waveform showing the change of a flyback voltage VNB for the circuit of FIG. 7.

Furthermore, because the secondary outputs are short circuited and the output voltage VO1 in the formula (1) is lowered, the absolute value of the flyback voltage VNB decreases. That is, the absolute value of the flyback voltage VNB of the switching power supply shown by Va in FIG. 3 is smaller than the absolute value of the flyback voltage VNB of the conventional switching power supply shown by Vb in FIG. 8. Then, at the time t2, the flyback voltage VNB starts to resonate. As the voltage at this time is expressed by $V_{NB}=Va \cdot e^{-At} \sin(wt+B)$, because a relatively low value is maintained up to time t2, the amplitude is small and even the maximum of Vgs is lower than the threshold Vth of the FETQ1, and accordingly the FETQ1 is prevented from turning on by the flyback voltage VNB.

After that, at the time t3, a voltage is applied to the gate of the FET Q1 through a starting circuit (a starting resistor R1 in this embodiment) of the FET Q1 constituting the main operating circuit 3 and the FET Q1 is again turned on.

In this way, because the turn-on of the FET Q1 is delayed and the off-state period of the FET Q1 is extended, the oscillation frequency is decreased. Therefore, the increase of switching loss due to the increase of the oscillation frequency is suppressed and the circuit efficiency is improved.

Figure 4:
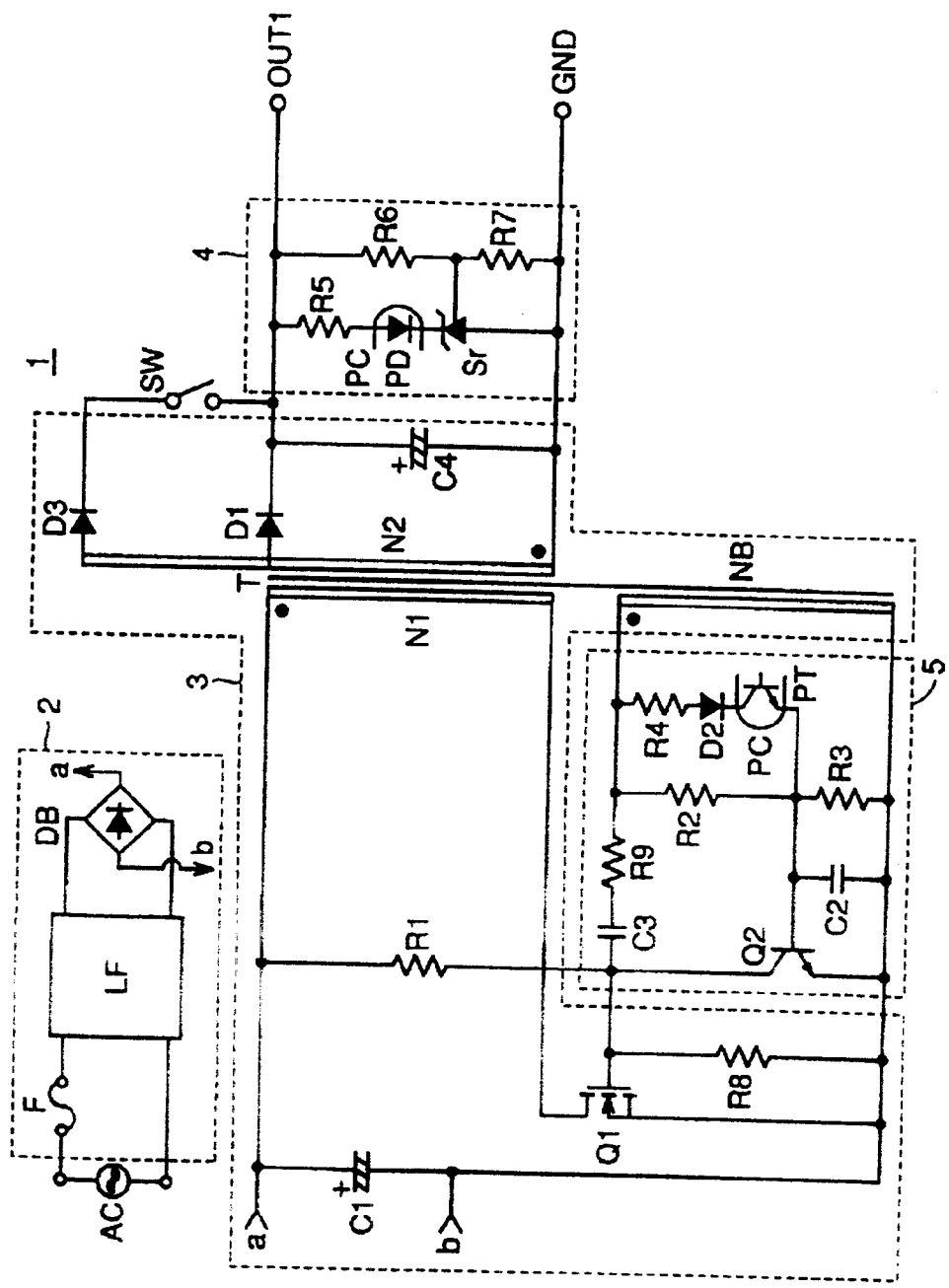
FIG. 4 is the circuit diagram of a switching power supply of yet another embodiment of this invention.

FIG. 4 is the circuit diagram of a switching power supply showing another embodiment of this invention. In the embodiment, the voltage output terminal OUT2 and the capacitor C5 of the embodiment shown in FIG. 1 are omitted, a voltage is taken only from a voltage output terminal OUT1, and voltages to be output are from a single output terminal. In this case, the turn-on of the FET Q1 through the feedback winding is prevented by turning on the switch SW.

Figure 5:
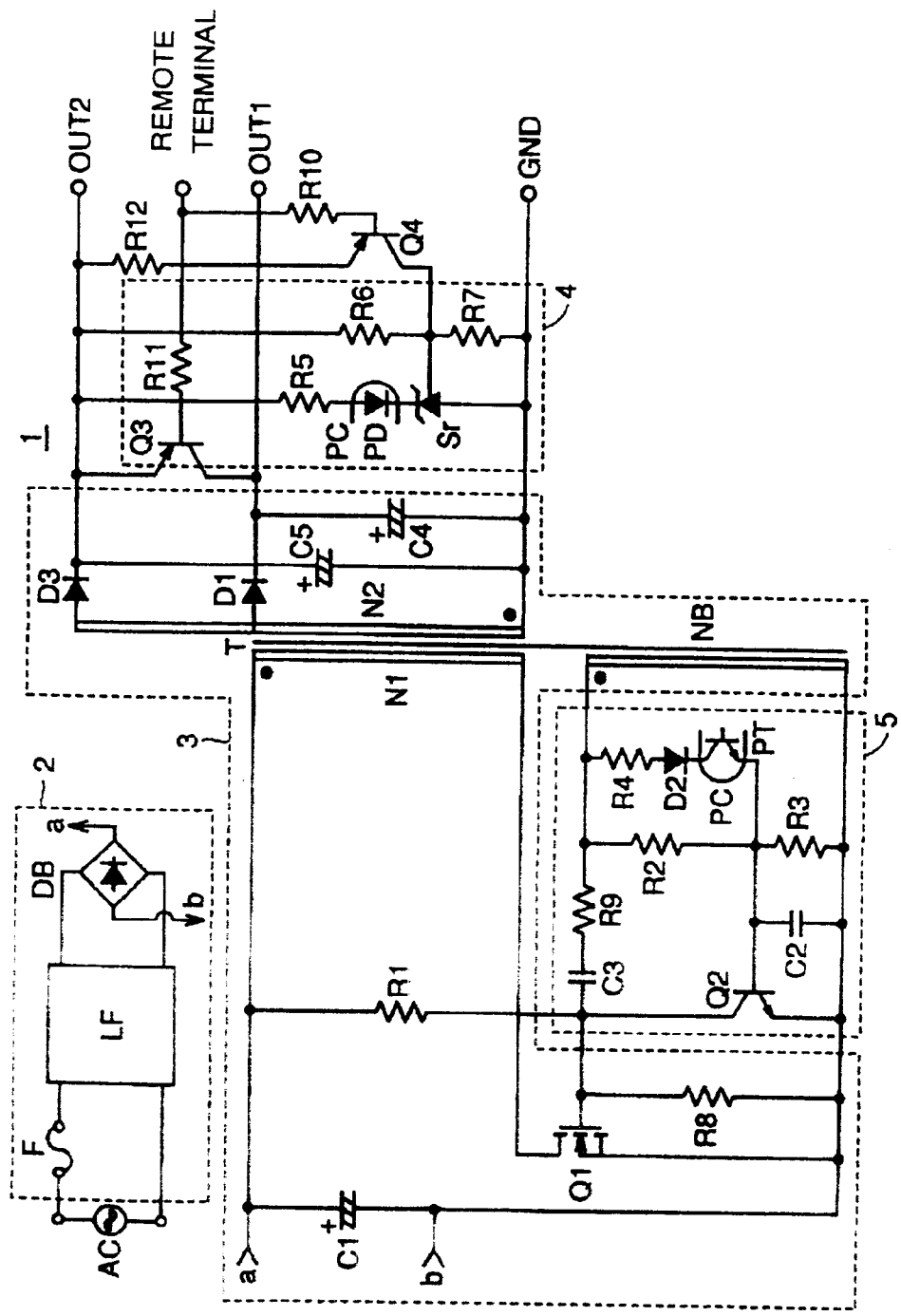
FIG. 5 is the circuit diagram of a switching power supply of still another embodiment of this invention.

FIG. 5 is the circuit diagram of a switching power supply showing a further embodiment of this invention. Instead of the switch SW1 shown in FIG. 2, a transistor Q3 is connected, and instead of the switch SW2 a transistor Q4 is connected. That is, to voltage output terminals OUT1 and OUT2 the collector and emitter of the transistor Q3 are connected, and to the connection point of resistors R6 and R7 and the voltage output terminal OUT2 the collector and emitter of the transistor Q4 are connected. The emitter may be connected through resistor R12. A control signal is provided to a remote terminal from the outside, and this control signal is provided to the base of the transistor Q4 through a resistor R10 and at the same time provided to the base of the transistor Q3 through a resistor R11.

When a level signal "L" is given to the remote terminal, the transistors Q3 and Q4 are made conductive, and then the voltage output terminals OUT1 and OUT2 are short circuited and at the same time the voltage to be output from the voltage output terminal OUT2 is lowered. Because of this, the loss can be improved by lowering the switching frequency.

Moreover, this embodiment can be also applied to the embodiments shown in FIGS. 1, 2, and 3.

Figure 6:
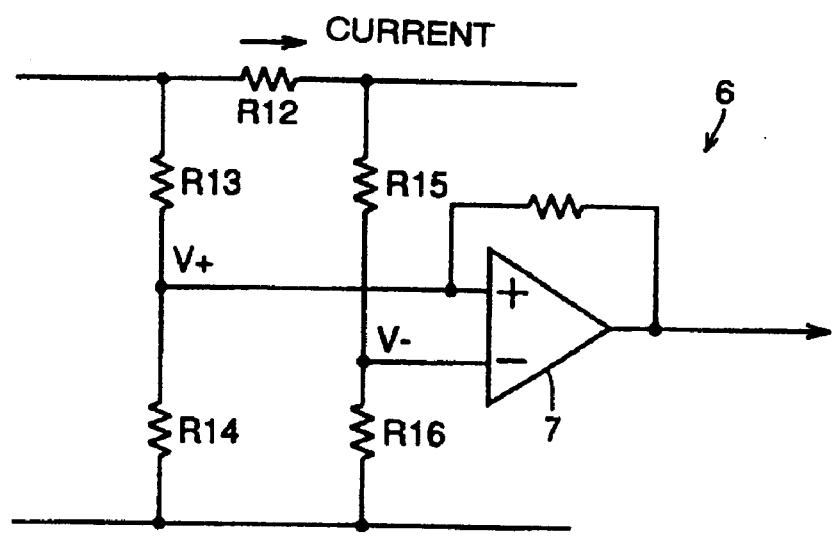
FIG. 6 is the circuit diagram showing one example of load power detecting circuits.

FIG. 6 is a circuit diagram showing one example of a load power detecting circuit. In FIG. 6, the load power detecting circuit 6 functions in such a way that when a current is supplied to a load from the voltage output terminal OUT1, a control signal is provided to the remote terminal shown in FIG. 5, depending on whether the load is a light load or a heavy load.

The load current detecting circuit 6 contains an operational amplifier 7, a voltage V+(V plus), that is, a voltage output from the voltage output terminal OUT1 and to be input to a resistor R12 which is divided by resistors R13 and R14, is provided to the +(plus) input terminal of the operational amplifier 7, and a voltage V−(voltage V minus), that is, a voltage output from a resistor R12 and divided by resistors R15 and R16 and provided to the −(minus) input terminal of the operational amplifier 7. At a heavy load, V+(V plus) becomes larger than V−(V minus) and the operational amplifier 7 outputs a level signal "H", and, at a light load, V−(V minus) becomes larger than V+(V plus) and the operational amplifier 7 outputs a level signal "L" to turn on the transistors Q3 and Q4.

It should be considered that all of the embodiments disclosed are illustrative in every respect and not restrictive. The scope of the present invention is not given by the above description, but given by the scope of the claims, and it is intended that all modifications in the meaning and scope equivalent to the scope of the claims should be included.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply having two or more DC outputs comprising:
    a DC power supply;
    a transformer having a primary winding, at least two secondary windings, and a feedback winding;
    a main switching element having an off-state period and an on-state period, connected in series to the primary winding and to be turned on by a voltage generated in the feedback winding, the main switching element having a control terminal and a threshold voltage to turn the main switching element on; and
    a rectifying circuit connected to each secondary winding, a starting circuit which initially turns on the main switching element at startup of the power supply and a switching circuit provided between the two DC outputs, and wherein, when the switching circuit is turned on, a voltage across both secondary windings attains the voltage level of the lesser of the two secondary windings, a voltage generated in the feedback winding is lowered during the off-state period of the main switching element and a voltage to be applied to the control terminal of the main switching element is controlled so as to be less than the threshold voltage, and the main switching element is turned on by the starting circuit.

2. The switching power supply of claim 1, wherein the at least two DC outputs comprise respectively, a low voltage output as a controlled output and a high voltage output as an uncontrolled output, and wherein the switching circuit is connected between the low voltage output and the high voltage output.

3. The switching power supply of claim 1, wherein the at least two DC outputs comprise, respectively, a high voltage output as a controlled output and a low voltage output as an uncontrolled output, and wherein the switching circuit is connected between the high voltage output and the low voltage output.

4. The switching power supply of claim 1, wherein both DC outputs are connected to a single voltage output terminal of the switching power supply.

5. The switching power supply of claim 1, wherein the switching circuit is turned on and off by an external signal.

6. The switching power supply of claim 2, wherein the switching circuit is turned on and off by an external signal.

7. The switching power supply of claim 3, wherein the switching circuit is turned on and off by an external signal.

8. The switching power supply of claim 4, wherein the switching circuit is turned on and off by an external signal.

9. The switching power supply of claim 1, wherein the switching circuit is turned on by detection of lowered load power.

10. The switching power supply of claim 2, wherein the switching circuit is turned on by detection of lowered load power.

11. The switching power supply of claim 3, wherein the switching circuit is turned on by detection of lowered load power.

12. The switching power supply of claim 4, wherein the switching circuit is turned on by detection of lowered load power.

13. The switching power supply of claim 1, wherein the main switching element has a voltage control terminal.

14. A switching power supply of claim 1, wherein the main switching element has a current control terminal.

15. The switching power supply of claim 5, further comprising a load current detecting circuit for detecting reduced load current and for supplying the external signal to turn on the switching circuit.

16. The switching power supply of claim 9, further comprising a load current detecting circuit for detecting reduced load current and for supplying a signal to turn on the switching circuit.

17. The switching power supply of claim 1, wherein the switching circuit comprises two switches, one connected between the DC outputs and the other connected between one of the DC outputs and a control input of a control circuit for controlling turn-off of said main switching element.

18. The switching power supply of claim 17, wherein the control input of the control circuit comprises a voltage sense input of a voltage regulator circuit.

19. The switching power supply of claim 1, wherein the switching circuit comprises a transistor switch.

20. The switching power supply of claim 17, wherein the two switches comprise transistor switches.

21. A switching power supply having two or more DC outputs comprising:
    a DC power supply;
    a transformer having a primary winding, at least two secondary windings, and a feedback winding;
    a main switching element having an off-state period and an on-state period, connected in series to the primary winding and to be turned on by a voltage generated in the feedback winding, the main switching element having a control terminal and a threshold voltage to turn the main switching element on; and
    a rectifying circuit connected to each secondary winding, a starting circuit which initially turns on the main switching element at startup of the power supply and a switching circuit provided between the two DC outputs, and wherein, when the switching circuit is turned on, a voltage across both secondary windings attains the voltage level of the lesser of the two secondary windings, a voltage generated in the feedback winding is lowered during the off-state period of the main switching element and a voltage to be applied to the control terminal of the main switching element is controlled so as to be less than the threshold voltage, and the main switching element is turned on by the starting circuit;
    and further comprising a voltage detection circuit coupled to a first of the secondary windings for providing a control signal to a voltage regulator control terminal to regulate the voltage of said first of the secondary windings, and wherein the switching circuit is provided between the output of a second of the secondary windings and the first of the secondary windings.

22. A switching power supply having two or more DC outputs comprising:
    a DC power supply;
    a transformer having a primary winding, at least two secondary windings, and a feedback winding;

a main switching element having an off-state period and an on-state period, connected in series to the primary winding and to be turned on by a voltage generated in the feedback winding, the main switching element having a control terminal and a threshold voltage to turn the main switching element on; and a rectifying circuit connected to each secondary winding, a starting circuit which initially turns on the main switching element at startup of the power supply and a switching circuit provided between the two DC outputs, and wherein, when the switching circuit is turned on, a voltage across both secondary windings attains the voltage level of the lesser of the two secondary windings, a voltage generated in the feedback winding is lowered during the off-state period of the main switching element and a voltage to be applied to the control terminal of the main switching element is controlled so as to be less than the threshold voltage, and the main switching element is turned on by the starting circuit;

and further comprising a voltage detection circuit coupled to a first of the secondary windings for providing a control signal to a voltage regulator control terminal to regulate the voltage of said first of the secondary windings, and wherein the switching circuit is provided between the output of the first of the secondary windings and the second of the secondary windings;

and further comprising a second switching circuit coupled between the first of the secondary windings and said voltage regulator control terminal.

23. A switching power supply having two or more DC outputs comprising:

a DC power supply;

a transformer having a primary winding, at least two secondary windings, and a feedback winding;

a main switching element having an off-state period and an on-state period, connected in series to the primary winding and to be turned on by a voltage generated in the feedback winding, the main switching element having a control terminal and a threshold voltage to turn the main switching element on; and a rectifying circuit connected to each secondary winding, a starting circuit which initially turns on the main switching element at startup of the power supply and a switching circuit provided between the two DC outputs, and wherein, when the switching circuit is turned on, a voltage across both secondary windings attains the voltage level of the lesser of the two secondary windings, a voltage generated in the feedback winding is lowered during the off-state period of the main switching element and a voltage to be applied to the control terminal of the main switching element is controlled so as to be less than the threshold voltage, and the main switching element is turned on by the starting circuit;

and further comprising a voltage detection circuit couple to a first of the secondary windings for providing a control signal to a voltage regulator control terminal to regulate the voltage of said first of the secondary windings, and wherein the switching circuit is provided between the output of the first of the secondary windings and the second of the secondary windings;

and further comprising a second switching circuit coupled between the first of the secondary windings and said voltage regulator control terminal;

and further wherein the first switching circuit and the second switching circuit are controlled by a remote signal.

24. The switching power supply of claim 23, further wherein the first and second switching circuits each comprise transistors; and wherein a control terminal of each transistor is coupled to receive the remote signal.

* * * * *